(12) United States Patent
Lipman et al.

(10) Patent No.: US 9,119,040 B2
(45) Date of Patent: Aug. 25, 2015

(54) TRILATERATION PROCESSING

(75) Inventors: Justin Lipman, Shanghai (CN); Robert A. Colby, Granite Bay, CA (US); Sigal Louchheim, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,914

(22) PCT Filed: Jul. 9, 2012

(86) PCT No.: PCT/CN2012/078346
§ 371 (c)(1),
(2), (4) Date: Aug. 4, 2014

(87) PCT Pub. No.: WO2014/008622
PCT Pub. Date: Jan. 16, 2014

(65) Prior Publication Data
US 2014/0334463 A1    Nov. 13, 2014

(51) Int. Cl.
*H04W 4/04* (2009.01)
*G01S 5/14* (2006.01)
*G01S 5/02* (2010.01)

(52) U.S. Cl.
CPC ........... *H04W 4/04* (2013.01); *G01S 5/021* (2013.01); *G01S 5/0242* (2013.01); *G01S 5/14* (2013.01)

(58) Field of Classification Search
CPC ..... H04W 24/00; H04W 84/18; H04W 84/12; H04W 4/04; H04W 4/20; H04W 4/23; H04W 4/25; H04L 43/50; H04L 43/0852; H04L 43/08; H04L 45/02; H04L 45/04; H04L 45/10; H04B 17/003
See application file for complete search history.

(56) References Cited

U.S. PATENT DOCUMENTS

| 8,634,853 B2 * | 1/2014 | Bogatin ..................... 455/456.1 |
| 8,655,372 B2 * | 2/2014 | Riesco et al. ............... 455/456.1 |
| 2002/0155845 A1 * | 10/2002 | Martorana ..................... 455/456 |
| 2005/0002481 A1 * | 1/2005 | Woo et al. ..................... 375/354 |

(Continued)

FOREIGN PATENT DOCUMENTS

| CN | 102291674 | 12/2011 |
| WO | WO-2012021610 | 2/2012 |

OTHER PUBLICATIONS

"PCT, International Search Report & Written Opinion of the ISA for PCT Application No. PCT/CN2012/078346", (Apr. 18, 2013), Whole Document.

*Primary Examiner* — Warner Wong
(74) *Attorney, Agent, or Firm* — Blakely, Sokoloff, Taylor & Zafman LLP

(57) ABSTRACT

Embodiments of the invention address how trilateration processes are affected by physical placement and sub-optimal selection of peer devices (PDs) used to obtain a location of a mobile computing device. Embodiments of the invention describe processes for selecting nearest PDs over further PDs, as received signal strength indicator (RSSI) measurements are more reliable—i.e., said "nearest PDs" provide more accurate distance measurements while improving the probability of finding more intersection points. Embodiments of the invention further describe selecting a physical spread of PDs to help increase the number of intersection points while helping distinction/resolution of the location of the mobile device in both the 'x' (longitude) and the 'y' (latitude) directions. Embodiments of the invention further enhance trilateration processes by utilizing dampening values for calculated location poll data.

18 Claims, 8 Drawing Sheets

(56) References Cited

U.S. PATENT DOCUMENTS

| | | | |
|---|---|---|---|
| 2006/0240840 A1* | 10/2006 | Morgan et al. | 455/456.1 |
| 2006/0267841 A1* | 11/2006 | Lee et al. | 342/463 |
| 2008/0123608 A1* | 5/2008 | Edge et al. | 370/338 |
| 2008/0153509 A1* | 6/2008 | Piekarski | 455/456.2 |
| 2011/0045844 A1* | 2/2011 | Muller et al. | 455/456.1 |
| 2011/0149756 A1* | 6/2011 | Chan et al. | 370/252 |
| 2011/0273991 A1 | 11/2011 | Dahl et al. | |
| 2012/0220309 A1* | 8/2012 | Yeh et al. | 455/456.1 |
| 2013/0016660 A1* | 1/2013 | Jalil et al. | 370/328 |
| 2013/0310064 A1* | 11/2013 | Brachet et al. | 455/456.1 |

* cited by examiner

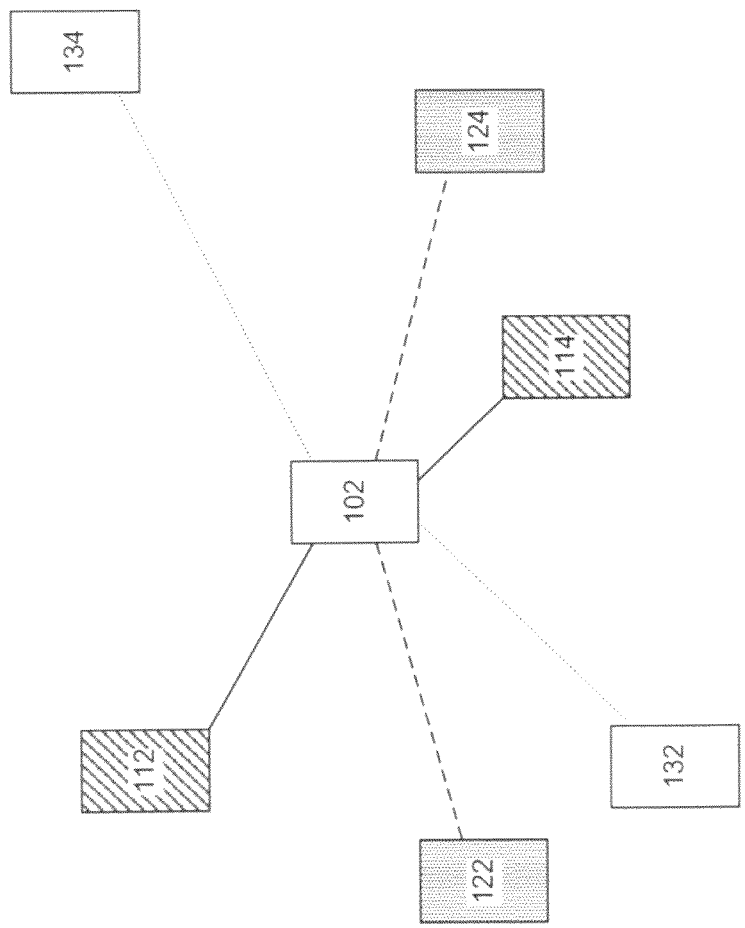

TRILATERATION PROCESSING

CLAIM OF PRIORITY

This application is a U.S. National Phase application under 35 U.S.C. §371 of International Application No. PCT/CN2012/078346, filed Jul. 9, 2012, entitled "IMPROVED TRILATERATION PROCESSING," the entire contents of which are incorporated herein by reference.

FIELD

Embodiments of the invention generally pertain to computing devices and more particularly to mobile computing device location identification processes via trilateration.

BACKGROUND

In geometry, trilateration (often alternatively referred to as triangulation) is the process of determining the absolute or relative location of a point in space by measurement of distances, using the geometry of circles, spheres or triangles. Location determination processes, such as Global Positioning Satellite (GPS) services, often use some form of trilateration.

For Wi-Fi (as defined, for example, by 802.11-2012—IEEE Standard for Information technology—Telecommunications and information exchange between systems Local and metropolitan area networks), a station (STA) is any device that contains an IEEE 802.11-conformant medium access control (MAC) and physical layer (PHY) interface to wireless medium (WM).

Trilateration may also be used for indoor location based services where a stationary or mobile device functioning as an STA is capable of receiving Wi-Fi beacon frames from multiple peer devices (PDs), such as Wi-Fi Access Points, laptops, mobile computing devices, beacons and/or fixed devices. PDs are used as reference points in trilateration processes, with the distance between the STA and PD being calculated using wireless signal strength measurements and a wireless propagation model (e.g., Freespace Path Loss Model or Two Ray Model).

Variations in STA movements and signal strengths can cause inaccuracies in trilateration calculations.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 1 is an illustration of peer devices surrounding a Wi-Fi station for utilizing an embodiment of the invention.

Figure 2A:
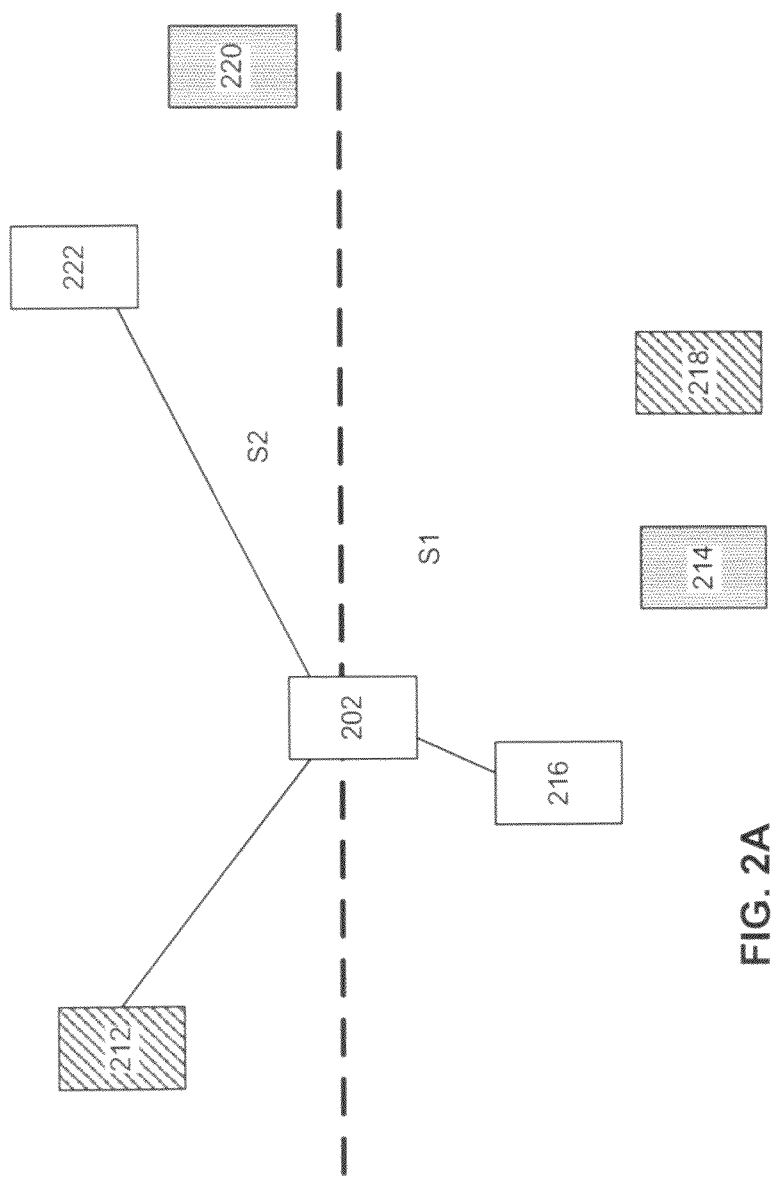
FIG. 2A and FIG. 2B are illustrations of peer devices surrounding Wi-Fi stations for utilizing embodiments of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system and method for enhanced mobile computing device location identification processes via trilateration are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Trilateration (often alternatively referred to as triangulation) describe processes utilizing geometric shapes such as circles, spheres or triangles for determining the absolute or relative location of a device. Trilateration may be used for location based services where a stationary or mobile device functioning as a station (STA) is capable of receiving Wi-Fi beacon frames from multiple peer devices (PDs). For example, trilateration may involve determining the intersection points on three circles—wherein the radius of the circles is the distance between the PDs and the STA whose location is being determined.

Embodiments of the invention address how trilateration processes are affected by the physical placement and suboptimal selection of PDs used to obtain the location of a mobile computing device. As described below, embodiments of the invention describe processes for selecting nearest PDs to an STA over further PDs, as received signal strength indicator (RSSI) measurements are more reliable—i.e., said "nearest PDs" provide more accurate distance measurements while improving the probability of finding more intersection points. Embodiments of the invention further describe selecting a physical spread of PDs help to increase the number of intersection points while helping distinction/resolution of the location of the STA in both the 'x' (longitude) and the 'y' (latitude) directions. Trilateration may be affected when PDs are placed in the same directional plane (e.g., as found in some office environments)—this is due to the variation in RSSI measurements (i.e., errors) which affects methods of trilateration and the accuracy.

FIG. 1 is an illustration of peer devices surrounding a Wi-Fi station for utilizing an embodiment of the invention. FIG. 1 illustrates STA 102 surrounded by a variety of PDs. In this example, PDs 112 and 114 are room/exit beacons, PDs 122 and 124 are wireless access points, and PDs 132 and 134 are laptops/mobile computing devices. This configuration is an example only, and is not meant to limit or define the types of PDs that may surround an STA utilizing an embodiment of the invention.

FIG. 1 illustrates the result of processes, according to embodiments of the invention, for selecting PDs for trilateration by assigning PDs to multiple weighted buckets. Each bucket may have varying depths depending upon how many intersection points or PDs are determined to be used for trilateration. In this embodiment, said buckets are two PDs deep (and thus are alternatively referred to as pairs); other embodiments may utilize more PDs per bucket.

In this embodiment, STA 102 is shown to receive Wi-Fi data from PDs 112, 114, 122, 124, 132 and 134. The "utility" of each PD is, in this example, to be determined by distance. Thus, PDs 112 and 114 are shown to be the PDs with the "highest" utility, while PDs 132 and 134 are shown to be the PDs with the "lowest" utility.

In some embodiments, the utility of a PD is based upon their distance to the STA (e.g., STA 102) and whether or not the STA is mobile. Nearby PDs have a higher utility and farther PDs have a lower utility. Utility may be measured depending upon the movement of the STA as follows:
  instantaneous distance (ID)—if an STA is not stationary, the distance may be measured over a last sample period, and the distance may be an average of all measurements for that period;
  average stationary distance (ASD)—this may be described as the average distance measured over a period an STA is stationary.
Alternatively, said sample period may be limited or a weighted decaying average may be used with older measurements having low weighting compared to new measurements.

PD utility is shown to be based from the calculation $U=1/D$, where D is ID or ASD depending upon STA movement. Other formulas for assigning utility may be used (e.g., exponential formulas, etc.).

Motion or gait of the STA may be determined by monitoring an accelerometer included in the device. When determining distance, the median of the samples may be used as a filter to remove spikes and spurious measurements over the sample period time (more complicated filters could be used).

Figure 2B:
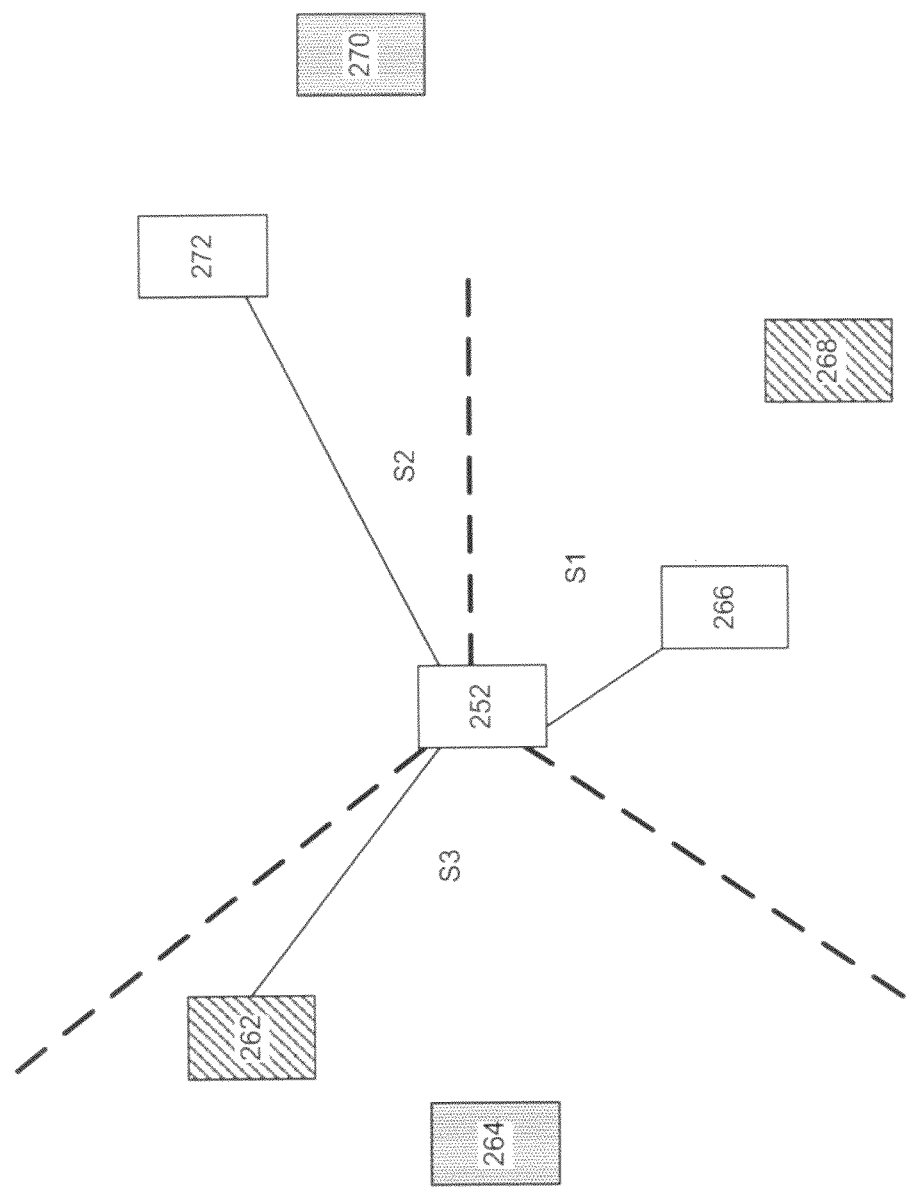

FIG. 2A and FIG. 2B are illustrations of peer devices surrounding Wi-Fi stations for utilizing embodiments of the invention. FIG. 2A illustrates the result of processes, according to embodiments of the invention, for selecting PDs for trilateration by assigning PDs to multiple weighted buckets. In this embodiment, presuming PDs are able to advertise or provide their static or detected geodetic/relative location, this location information is utilized (for example, in addition to the process described above with respect to FIG. 1) to ensure the selection of PDs that provide the best "physical spread" and nearest distance—i.e., said PDs are assigned a higher weighting for trilateration calculation processes.

FIG. 2A illustrates a two sector spread. In one embodiment, a list of all PDs with their respective utility (e.g., the distance based utility as discussed above with respect to FIG. 1) is created. An initial PD from the list with highest utility is selected—in this example, PD 216. Two virtual sectors (shown as S1 and S2) are created around STA 202, with each sector being 180 degrees (i.e., to cover the 360 degree space around STA 202). A PD from S1 (i.e., PD 216) is selected, and another PD from S2 that has the next highest utility (i.e., PD 212) is also selected. A third PD from either S1 or S2 which has the next highest utility (i.e., PD 222 of S2) is then selected. This set of PDs—212, 216 and 222, are used to form a bucket for trilateration processes.

The above described process may be repeated to fill up additional buckets of a reduced reliability weight (i.e., PDs 214, 218 and 220 may be grouped together for an additional trilateration process).

When said PDs are allocated to their respective buckets, embodiments of the invention may calculate multiple intersection points for each bucket to obtain a trilaterated location and take the average location for each bucket. Each trilaterated location for each bucket may then be combined given the weights assigned to the individual buckets.

The benefit of such an approach is that while the initial bucket (in this example, PDs 212, 216 and 222) may be highly weighted, given the nature of RSSI measurements, it is possible that not all circles used for trilateration overlap (have intersection points). Thus, embodiments of the invention are able to use the result from the second, lower weighted bucket to refine the calculated position of STA 202. Example equations for these processes are:

$$\text{Tri}(B_n) = \text{Average}(\text{Intersection Points}(\text{Peers in } B_n))$$

$$\text{STA\_Location} = w_1\text{Tri}(B_1) + w_2\text{Tri}(B_2) + \ldots w_n\text{Tri}(B_n)$$

The respective weightings used in the above equations may be, for example, pre-assigned. These may be viewed as offsets or corrections from the location determined from the initial bucket.

As an alternative given lack of intersection points, it is also possible for embodiments of the invention to randomly mix the highest weighted buckets into new buckets and attempt to trilaterate again for the current sample period with lower confidence.

FIG. 2B illustrates the result of processes, according to embodiments of the invention, for selecting PDs for trilateration by assigning PDs to multiple weighted buckets. In this embodiment, presuming PDs are able to advertise or provide their static or detected geodetic/relative location, this location information is utilized (for example, in addition to the process described above with respect to FIG. 1) to ensure the selection of PDs that provide the best "physical spread" and nearest distance—i.e., said PDs are assigned a higher weighting for trilateration calculation processes.

FIG. 2B illustrates a three sector spread. In one embodiment, a list of all PDs with their respective utility (e.g., the distance based utility as discussed above with respect to FIG. 1) is created. An initial PD from the list with highest utility is selected—in this example, PD 266. Three virtual sectors (shown as S1, S2 and S3) are created around STA 252, with each sector being 120 degrees (i.e., to cover the 360 degree space around STA 252). In this embodiment, sector S1 is shown to be selected where PD 266 is at its midpoint.

A PD from S1 (i.e., PD 266) is selected, and other PDs from S2 and S3 which have the next highest utility (i.e., PD 272 and 262, respectively) are also selected. This set of PDs—266, 272 and 262, are used to form a bucket for trilateration processes.

The above described process may be repeated to fill up additional buckets of a reduced reliability weight (i.e., PDs 264, 268 and 270 may be grouped together for an additional trilateration process).

Errors associated with the resulting wireless trilaterated location of the STA versus its real position may persist, even with the PD selection processes described above. Such errors may be caused by wireless indoor multipath signal propagation, obstacles and noise in the environment. Trilateration processes can provide multiple location measurements per second; however, the measurement error on average may vary from one meter to ten meters or more. This may result in significant random oscillation of the final determined location and also provide a poor user experience. Furthermore, prior trilateration processes do not filter results, do not account for user perception (over a period of time) and do not account for the physical movement of the person carrying the mobile computing device (e.g., how fast they are walking, whether they are standing still, what direction they are moving in, how often the map display is refreshed, etc.).

Embodiments of the invention enhance trilateration processes by improving overall accuracy and performance while taking into account the movement of the device (e.g., direction and speed) and user perception (e.g., limiting oscillations and map update intervals). Levels of dampening may be applied that incorporate realistic physical movement of the device while also accounting for map update periods to collate measurements over a period of time.

The movement of the client device may be obtained from monitoring an included accelerometer—it is possible to measure whether a person holding the device is stationary or walking and potentially even if their gait is fast or slow. Furthermore, the device itself may have been placed on a flat surface. The direction of the device may be obtained from a magnetometer combined with an estimation of the resulting motion vector given prior location measurements.

Embodiments of the invention may be described as defining two hypothetical levels (e.g., concentric rings) around the client device performing the trilateration—i.e., an "inner-ring" and an "outer-ring". The radius of each ring may be determined based on both the limitations of the technology and the velocity of the device.

Figure 3:
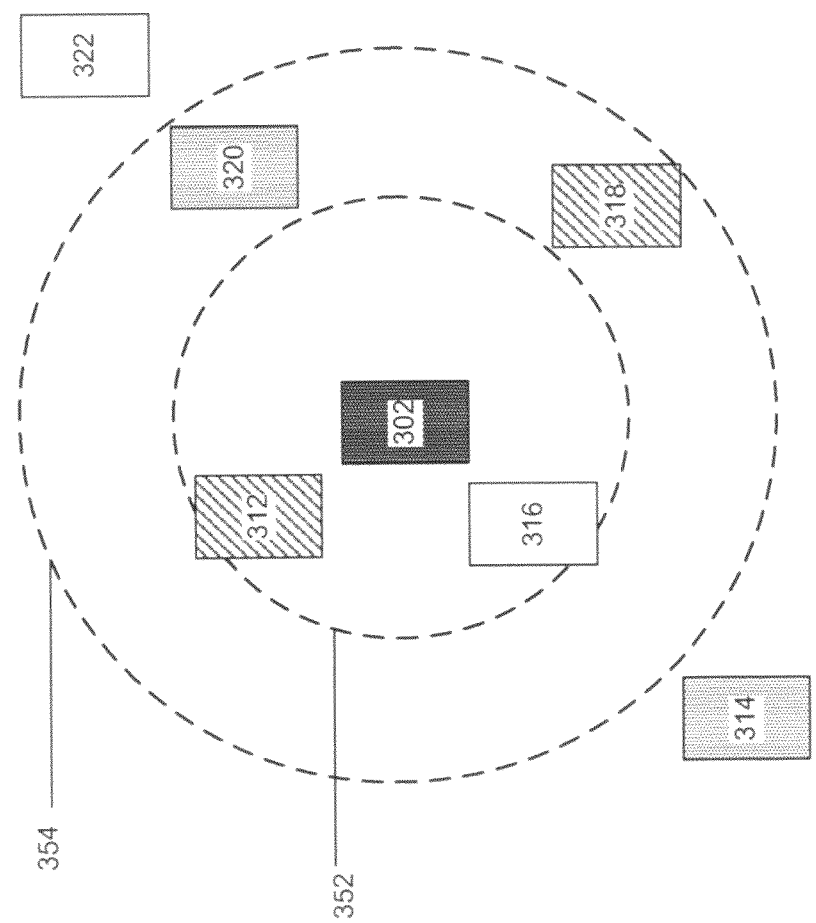
FIG. 3 is an illustration of calculated poll locations for a Wi-Fi station utilized by an embodiment of the invention.

FIG. 3 is an illustration of calculated poll locations for a Wi-Fi station utilized by an embodiment of the invention. FIG. 3 illustrates mobile computing device STA 302, and calculated poll locations 312, 314, 316, 318, 320 and 322. As described below, poll locations 312 and 316, shown to be within ring 352, are stored as the more reliable calculated locations, while poll locations 320 and 318, shown outside ring 352 but inside ring 354, are stored with a reduced reliability value. Poll locations 314 and 322, shown to be outside both rings 352 and 354, may be stored with a more reduced reliability value, or disregarded.

For purposes of explanation, the follow variables may be defined as:

Sample period T=time between map updates. To reach high levels of accuracy, embodiments of the invention presume to have multiple samples per second during motion.
P=Current poll location (x1,y1)
W=weight associated with current poll (P)
L=Previous calculated location
V=Velocity (estimated based on accelerometer)
Ri=Inner-ring radius, based on technology accuracy limitations+velocity adjustment
Ro=Outer-ring radius based on a multiple of the inner ring (e.g. three times Ri).

The following is an example of how ring size may be calculated:
Assuming a 10 m accuracy limitation for device STA 302, a technology multiplier of three, a velocity adjustment of V times three, and a moving speed of 1 m per polling period:

Ri=10 m+(1m×3); and

Ro=(10 m+(1m×3))×3.

Thus, ring 352, is the above example, is calculated as 13 m, while ring 354 is calculated as 39 m.

Assuming the device is stationary (i.e., velocity is zero) embodiments of the invention may further reduce the ring size for each poll period as the device's location begins to stabilize (the first polls may be deemed as less trustworthy until the process averages the location). To do this, embodiments of the invention may adjust weight for L (i.e., trust it less), and gradually reduce the ring size for each poll until we reach zero. For example, if we choose to reduce ring size by 1/10, then after 10 polls a velocity multiplier of zero is utilized.

Once ring size has been determined, if the current poll, (P), is outside outer ring 354—such as poll locations 314 and 322, it may be classified as an outlier and given the lowest weight. If the current poll is between the inner ring 352 and outer ring 354—such as poll locations 318 and 320, it may be included in the new distance calculation with a reduced weight since it is farther than expected for a non-moving device. If the current poll is within inner ring 352—such as poll locations 312 and 316, it may be included in the new distance calculation with a weight of 1.

Thus, the calculation of reliability weights for stationary devices may be represented as:

if (distance(P, L)>=Ro), then the weight associated with P is set to zero: (W=0);

if (Ro>distance(P, L)>=Ri), then the weight (W) associated with P is a reduced reliability weight (i.e., predetermined dampened value) such as 0.25: (W=0.25);

if (distance(P, L)<Ri), then the weight W associated with P will be 1: (W=1).

L may then be calculated as follows: $L=L_{new}=1/n(N*L_{prev}(P-L_{prev})*W)$, where W for the previous poll samples was determined in previous iterations and n is the number of polls since the last time when the velocity (V) changed to zero. In other words a weighted average over the time the device stayed stationary is calculated. L is stored and the process waits for the next sample period T.

Another factor for determining ring size may be velocity and change in velocity, which is a variable based on the movement of the device. Embodiments of the invention may take into account velocity with respect to ring size as described below (i.e., ring size changes once the device is determined to be in motion, thus in motion ring sizes may be larger than stationary ring sizes).

Figure 4:
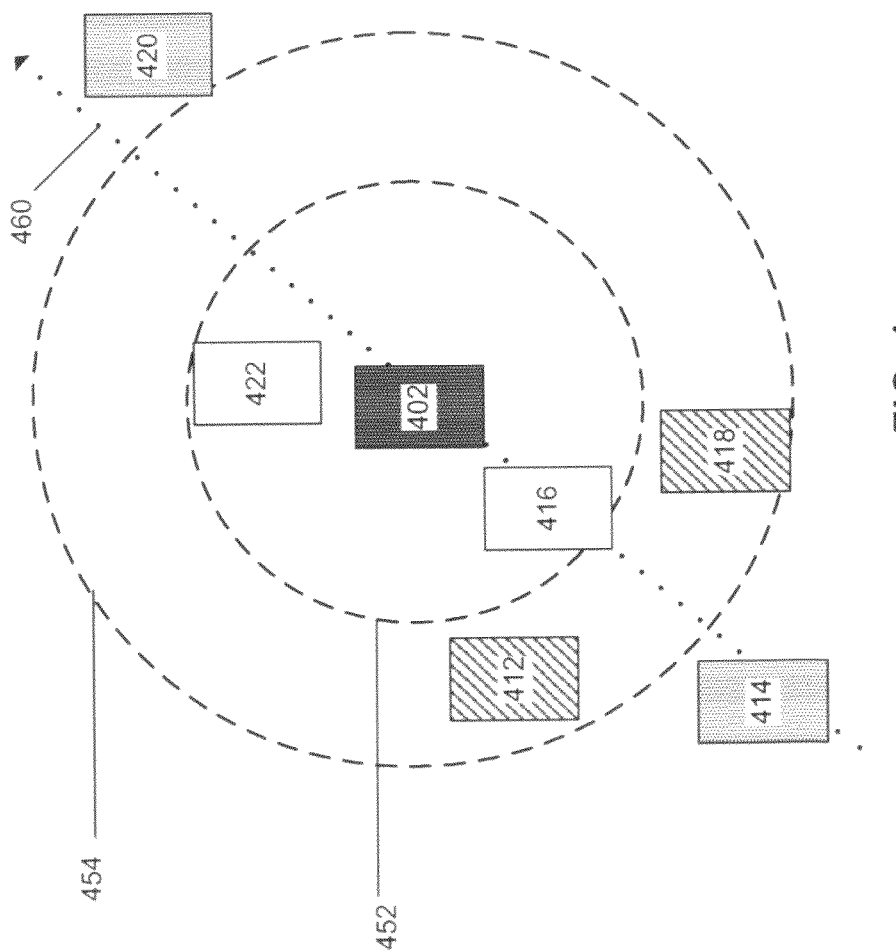
FIG. 4 is an illustration of calculated poll locations for an in-motion Wi-Fi station utilized by an embodiment of the invention.

FIG. 4 is an illustration of calculated poll locations for an in-motion Wi-Fi station utilized by an embodiment of the invention. FIG. 4 illustrates mobile computing device STA 402, and calculated poll locations 412, 414, 416, 418, 420 and 422. As described below, poll locations 422 and 416, shown to be within ring 452, are stored as the more reliable calculated locations, while poll locations 412 and 418, shown outside ring 452 but inside ring 454, are stored with a reduced reliability value. Poll locations 414 and 420, shown to be outside both rings 452 and 454, may be stored with a more reduced reliability value, or disregarded. In this example, STA 402 is shown to be moving in direction 460.

Similar to the embodiment of the invention described above with respect to FIG. 3, once ring size has been determined, if the current poll, (P), is outside outer ring 454—such as poll locations 414 and 420, it may be classified as an outlier and given the lowest weight. If the current poll is between the inner ring 452 and outer ring 454—such as poll locations 412 and 418, it may be included in the new distance calculation with a reduced weight since it is farther than expected for a non-moving device. If the current poll is within inner ring 452—such as poll locations 412 and 416, it may be included in the new distance calculation with a weight of 1.

Using these weights, L may then be calculated as follows: $L=\frac{1}{2}(w_v*L_{prev}+(2-w_v)*P*W)$, where W for the previous poll samples was determined in previous iterations (represented in $L_{prev}$) 1 and is a variable allowing us to give additional weighting to $L_{prev}$ that can be based on velocity. In other words if STA 402 moves 10 m between polls, a much lower weight may be given to $L_{prev}$ compared to if STA 402 moves 1 m between polls. Using this method a weighted average over the time the device is in motion is calculated, the process stores L and waits for the next sample period T.

In some embodiments, if the direction of movement is known, then it is possible to further restrict the filtering by adjusting the reliability weight higher within a focus area given the direction the device is moving. The degree of the focus area can be static or adaptive—i.e., adjusted depending upon the rate of movement or change of direction. Furthermore, from a user experience perspective, it is possible to animate the movement of the on-map icon from the current position to the new averaged position over the period of the map update time. This provides a smoother user experience than simply plotting a new on-map icon.

Figure 5A:
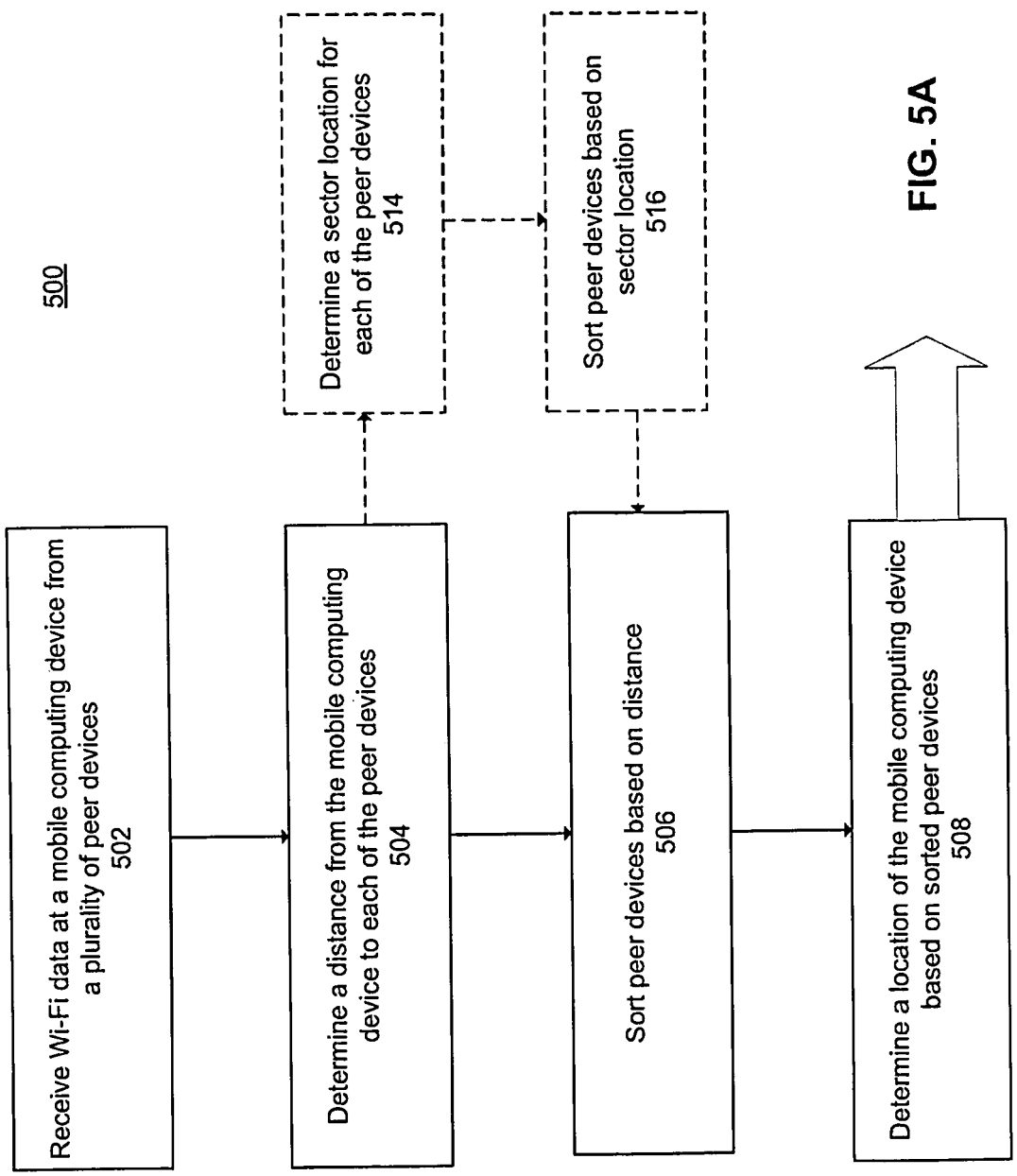
FIGS. 5A and 5B are flow diagrams of processes for improved trilateration results according to embodiments of the invention.
Figure 5B:
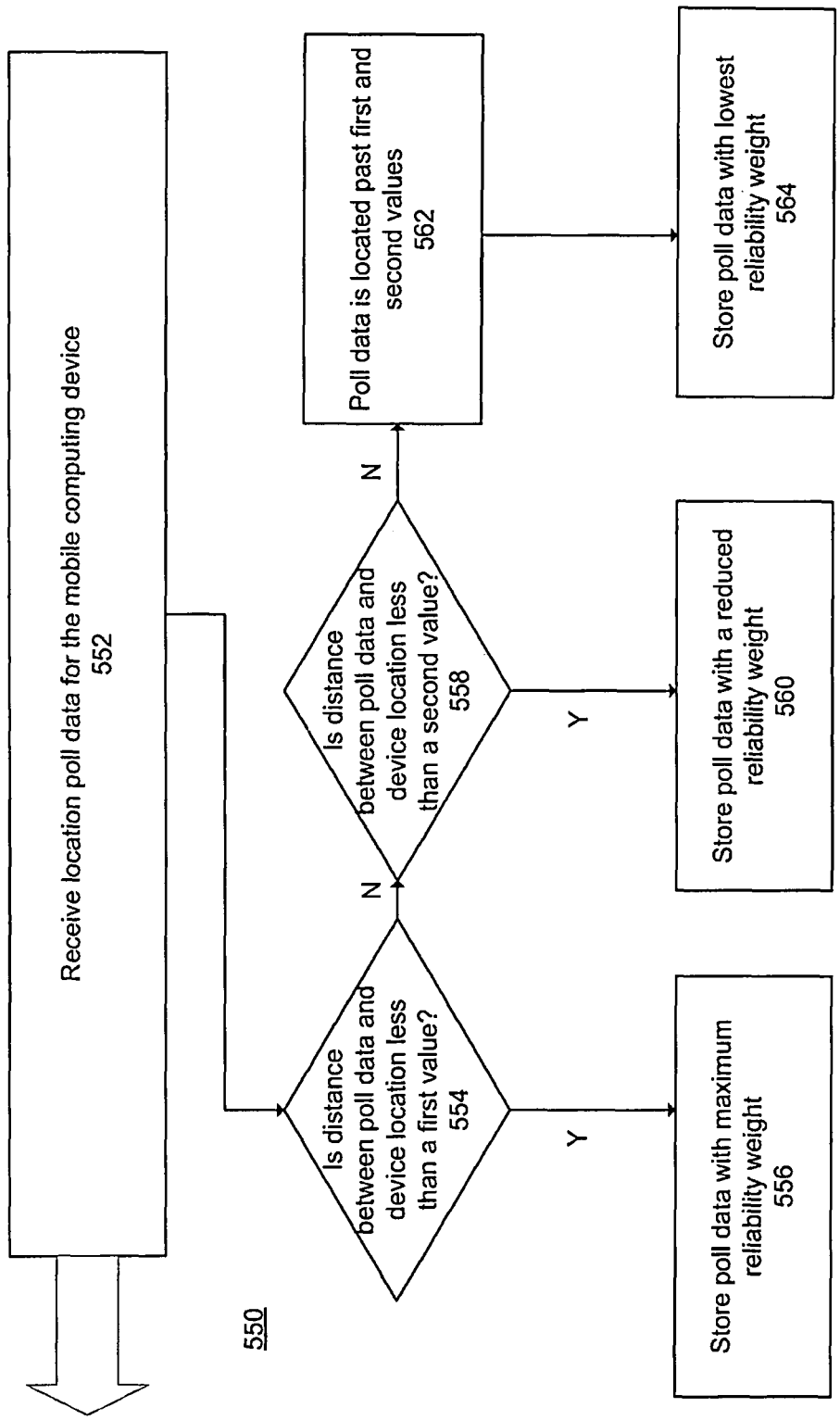

FIGS. 5A and 5B are flow diagrams of processes for improved trilateration results according to embodiments of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 500 includes operations for receiving Wi-Fi data at an STA from a plurality of PDs, 502. This Wi-Fi data is used to determine a distance from the STA to each of the PDs, 504 (e.g., using RSSI measurements). The PDs are then sorted based on a utility determination, such as by distance, 506. In some embodiments, as described above, a sector location for each PD is determined, 514, and the PDs are further sorted by their respective sector location, 516. A trilateration process is executed based on the sorted PD list, 508. In some embodiments, said trilateration process is executed using a subset of the plurality of PDs (e.g., a high-utility "bucket" as described above).

To further improve trilateration results, process 550 includes operations for receiving location poll data for the STA, 552. If the location poll data is within a first value, 554, it is stored with the maximum reliability weight, 556 (e.g., a weight of one). If the location poll data is between first and second values, 558, then the location poll data is stored with a reduced reliability weight, 560 (e.g., a non-zero value less than one). If the location poll data is outside of the first and second values, 562, then the location data may be classified as an outlier and given the lowest reliability weight, 564.

Figure 6:
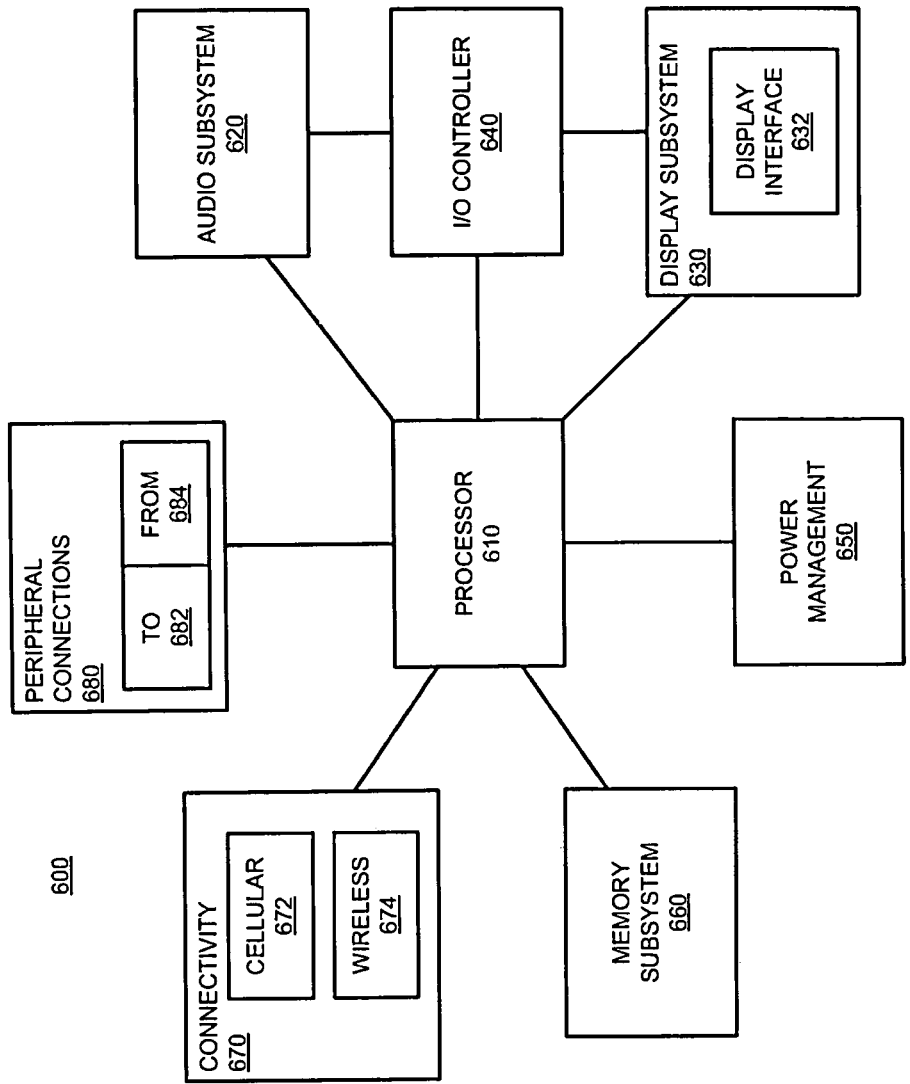
FIG. 6 is a block diagram of a device incorporating an embodiment of the invention.

FIG. 6 is a block diagram of a device incorporating an embodiment of the invention. Computing device 600 represents a mobile computing device, such as a computing tablet, a mobile phone or smartphone, a wireless-enabled e-reader, or other wireless mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, processor cores, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, or other hardware that can be included in device 600. The input can be part of a direct user interaction, as well as providing environmental input to the system to influence its operations (such as filtering for noise, adjusting displays for brightness detection, applying a flash for a camera, or other features). In one embodiment, device 600 includes power management 650 that manages battery power usage, charging of the battery, and features related to power saving operation.

Memory subsystem 660 includes memory devices for storing information in device 600. Memory can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600.

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth), local area networks (such as Wi-Fi), and/or wide area networks (such as Wi-Max), or other wireless communication. Connectivity 670 may receive Wi-Fi beacons, used to execute the trilateration processes of embodiments of the invention described above.

Peripheral connections 680 include hardware interfaces and connectors, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Thus, embodiments of the invention describe apparatuses, systems and methods including operations for receiving Wi-Fi data at a mobile computing device from a plurality of peer devices, determining a distance from the mobile computing device to each of the plurality of peer devices, sorting the peer devices based on the determined distance, and determining a location of the mobile computing device using a subset of the sorted list of peer devices. In some embodiments, said received Wi-Fi data comprises Wi-Fi beacon frames.

In some embodiments, an area surrounding the aforementioned mobile computing device comprises at least two sectors, and operations for determining a sector location for each of the plurality of peer devices, and sorting the peer devices further based on sector location of each device are also executed.

In some embodiments, the aforementioned mobile computing device is non-stationary, and determining a distance from the mobile computing device to each of the plurality of peer devices is based on averaging distance calculations over a sample period. In other embodiments, where the mobile computing device is stationary, determining a distance from the mobile computing device to each of the plurality of peer devices includes reducing reliability of distance calculations when the mobile computing device was non-stationary.

Embodiments of the invention further describe apparatuses, systems and methods including operations for receiving location data for a mobile computing device, the location data determined, at least in part, from Wi-Fi data received from a plurality of other devices, storing the location data if a distance between the received location data and a location of the mobile computing device is less than a first distance value, storing the location data with a first reduced reliability weight if the distance between the received location data and the location of the mobile computing device is greater than the first distance value and less than a second distance value, and storing the location data with a second reduced reliability weight if the distance between the received location data and the location of the mobile computing device is greater than the second distance value. In some embodiments, the second reduced reliability weight is zero. In some embodiments, the second distance value is a multiple of the first distance value.

In some embodiments, operations executed further include determining the mobile computing device is non-stationary, determining a directional vector for the mobile computing device, storing the location data if the distance between the received location data and the location of the mobile computing device is greater than the first distance value and less than a second distance value, and the received location data towards the determined directional vector, and storing the location data with the second reduced reliability weight if the distance between the received location data and the location of the mobile computing device is greater than the first distance value and less than a second distance value, and the received location data is not towards the determined directional vector.

In some embodiments, determining the directional vector of the mobile computing device is based, at least in part, on sensor data received from at least one of an accelerometer and a compass.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. The computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A non-transitory machine-readable storage medium having computer executable instructions stored thereon that, when executed, cause a processor to perform a method comprising:
   receiving Wi-Fi data at a mobile computing device from a plurality of peer devices;
   determining a distance from the mobile computing device to each of the plurality of peer devices, including, when the mobile computing device is stationary, reducing reliability of distance calculations when the mobile computing device was non-stationary;
   sorting the peer devices based on the determined distance; and
   determining a location of the mobile computing device using a subset of the sorted list of peer devices.

2. The machine-readable storage medium of claim 1, wherein an area surrounding the mobile computing device comprises at least two sectors, and the method further comprises:
   determining a sector location for each of the plurality of peer devices; and
   sorting the peer devices further based on sector location of each device.

3. The machine-readable storage medium of claim 1, wherein the received Wi-Fi data comprises Wi-Fi beacon frames.

4. The machine-readable storage medium of claim 1, wherein, when the mobile computing device is non-stationary, determining a distance from the mobile computing device to each of the plurality of peer devices is based on averaging distance calculations over a sample period.

5. A mobile computing device comprising:
   a processor;
   a memory; and
   trilateration logic executed via the processor to:
   receive Wi-Fi data from a plurality of peer devices;
   determine a distance from the mobile computing device to each of the plurality of peer devices, including, when the mobile computing device is stationary, reducing reliability of distance calculations when the mobile computing device was non-stationary;
   sort the peer devices based on the determined distance; and
   determine a location of the mobile computing device using a subset of the sorted list of peer devices.

6. The mobile computing device of claim 5, wherein an area surrounding the mobile computing device comprises at least two sectors, and the trilateration logic to further:
   determine a sector location for each of the plurality of peer devices; and
   sort the peer devices further based on sector location of each device.

7. The mobile computing device of claim 5, wherein the received Wi-Fi data comprises Wi-Fi beacon frames.

8. The mobile computing device of claim 5, wherein, when the mobile computing device is non-stationary, determining a distance from the mobile computing device to each of the plurality of peer devices is based on averaging distance calculations over a sample period.

9. A non-transitory machine-readable storage medium having computer executable instructions stored thereon that, when executed, cause a processor to perform a method comprising:
   receiving location data for a mobile computing device, the location data determined, at least in part, from Wi-Fi data received from a plurality of other devices;
   determining a directional vector for the mobile computing device;
   storing the location data if a distance between the received location data and the location of the mobile computing device is greater than the first distance value and less than a second distance value, and the received location data is towards the determined directional vector;
   storing the location data with a first reduced reliability weight if the distance between the received location data and the location of the mobile computing device is greater than the first distance value and less than a second distance value; and
   storing the location data with the second reduced reliability weight if the distance between the received location data and the location of the mobile computing device is greater than the first distance value and less than a second distance value, and the received location data is not towards the determined directional vector.

10. The machine-readable storage medium of claim 9, the method further comprising:
    determining the mobile computing device is non-stationary.

11. The machine-readable storage medium of claim 10, wherein determining the directional vector of the mobile computing device is based, at least in part, on sensor data received from at least one of an accelerometer and a compass.

12. The machine-readable storage medium of claim 9, further comprising:
    storing the location data if a distance between the received location data and a location of the mobile computing device is less than a first distance value; and
    storing the location data with a second reduced reliability weight if the distance between the received location data and the location of the mobile computing device is greater than the second distance value.

13. The machine-readable storage medium of claim 9, wherein the second reduced reliability weight is zero and the second distance value is a multiple of the first distance value.

14. A mobile computing device comprising:
    a processor;
    a memory; and
    trilateration logic executed via the processor to:
    receive location data for a mobile computing device, the location data determined, at least in part, from Wi-Fi data received from a plurality of other devices;
    determine a directional vector for the mobile computing device;
    store the location data if a distance between the received location data and the location of the mobile computing device is greater than the first distance value and less than a second distance value, and the received location data is towards the determined directional vector;
    store the location data with a first reduced reliability weight if the distance between the received location data and the location of the mobile computing device is greater than the first distance value and less than a second distance value; and
    store the location data with the second reduced reliability weight if the distance between the received location data and the location of the mobile computing device is greater than the first distance value and less than a second distance value, and the received location data is not towards the determined directional vector.

15. The mobile computing device of claim 14, the trilateration logic to further:
determine the mobile computing device is non-stationary.

16. The mobile computing device of claim 15, wherein determining the directional vector of the mobile computing device is based, at least in part, on sensor data received from at least one of an accelerometer and a compass.

17. The mobile computing device of claim 14, the trilateration logic to further:
store the location data if a distance between the received location data and a location of the mobile computing device is less than a first distance value; and
store the location data with a second reduced reliability weight if the distance between the received location data and the location of the mobile computing device is greater than the second distance value.

18. The mobile computing device of claim 14, wherein the second reduced reliability weight is zero and the second distance value is a multiple of the first distance value.

\* \* \* \* \*